Nov. 3, 1970   D. K. DUSTON ETAL   3,538,298
METHOD FOR BALANCING ROTATING OBJECTS
WITH LASER RADIATION
Filed July 17, 1968   2 Sheets-Sheet 1

Inventors:
David K. Duston,
Charles W. Clapp,
by Paul A. Frank
Their Attorney.

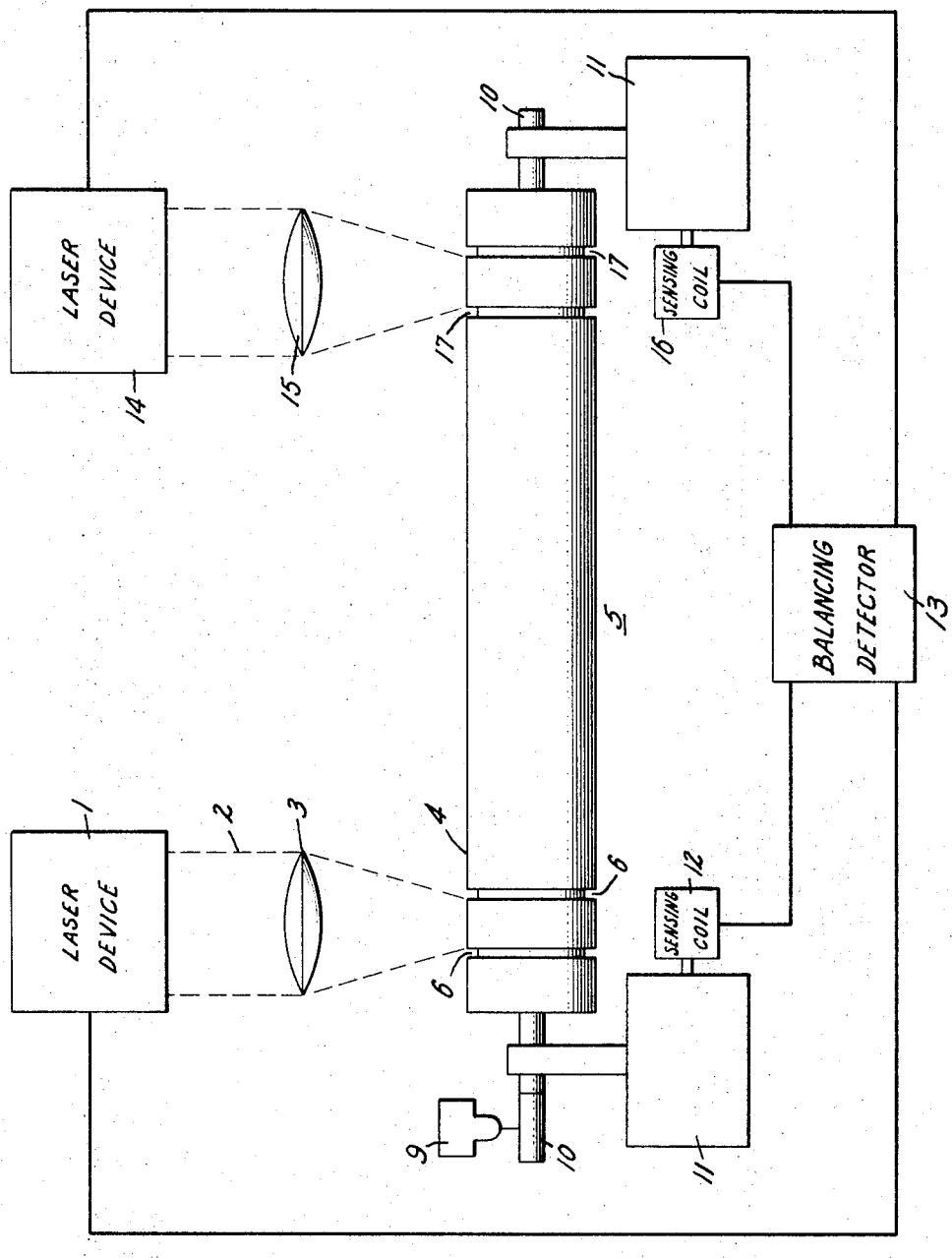

United States Patent Office 3,538,298
Patented Nov. 3, 1970

3,538,298
METHOD FOR BALANCING ROTATING OBJECTS WITH LASER RADIATION
David K. Duston, Schenectady, N.Y., and Charles W. Clapp, Lynn, Mass., assignors to General Electric Company, a corporation of New York
Filed July 17, 1968, Ser. No. 745,548
Int. Cl. B23k 27/00
U.S. Cl. 219—121                          5 Claims

ABSTRACT OF THE DISCLOSURE

A rotating object with rotational imbalance is irradiated with pulses of radiation emitted by a laser. The pulses of radiation are focused on a portion of the object surface which is defined by the intersection of the region causing the imbalance and the area between a pair of annular grooves. The radiation vaporizes, ablates, or otherwise removes material and leaves a smooth crater-like depression between the grooves without a recast deposit, thus balancing the rotating object.

---

This invention relates to an apparatus and method for balancing high speed rotational units, and more particularly to an apparatus and method wherein a high speed rotational unit is irradiated with laser radiation to remove excess material causing rotational imbalance.

After the fabrication of objects employed as high speed rotational units such as components of electric motors, armatures, gyroscopes, and the like, it is usually necessary to balance the units due to rotary imperfections. Because even a small variation in symmetry about the axis of rotation causes undue vibrations adversely affecting the rotating unit and peripheral equipment, the excess material in the "heavy side" of the unit must be removed. There are many devices well known in the art which are utilized to locate the unit's "heavy side." One typical example is a device using a stroboscopic light to illuminate one or more sequentially numbered bands circumscribing one or both ends of the rotating unit. The number or numbers on the band which appear coincidental with the strobe light, that is, appear to stand still in the light, indicate the location of the heavy side of the rotating unit. Thus, the heavy side is located at a region running longitudinally along the surface of the rotating unit.

It is a usual technique to mill a series of circumferential grooves in the unit surface during fabrication which act as guides for drills. The drills are then utilized to remove the excess material in the unit along the heavy side, thus giving the unit the proper balance for rotary motion.

After an initial step of material removal, the unit is again rotated to determine the effectiveness of removal and the location of the probable new heavy side. The imbalance that results after the initial drilling is ordinarily due to over-compensation or under-compensation during drilling. The cycle may be repeated until a point is reached at which an operator is no longer able to remove material without over-compensation.

As is readily evident, the removal of material through present mechanical techniques is both time consuming and expensive. It has been suggested in the prior art that present laser apparatus may provide for rapid metal removal with a high degree of sensitivity. One proposal suggests using a laser of the pulsed type in cooperation with apparatus for detecting the heavy side. By focusing the laser pulse on the heavy side of the rotating unit, the metal coming within the focused diameter during the pulse "length" or duration is vaporized. The feasibility, however, of employing a laser for removal of material from rotating objects is limited by a recast layer formed when molten material flows over the edges defining the irradiated area and solidifies upon contact with the cooler adjacent material. The recast layer adds to the asymmetry around the axis of rotation and increases wind drag. Being structurally weaker, the layer also has a tendency to break off, causing further rotary imperfections during operation, and, in the case of precision instruments, damaging shaft bearings.

Attempts in the prior art for reducing the recast layer by directing the pulse at tangential angle to the rotating surface have met with less than satisfactory success. In this case, the layer, though reduced in size, is still present and increased energy levels are required to remove the material.

It is therefore an object of our present invention to provide a method of balancing a rotating object wherein the excess material in the heavy side of the rotating object may be quickly and efficiently removed.

It is another object of our present invention to provide a method for balancing a rotating object with a laser device wherein the excess material in the heavy side is removed without formation of a recast layer.

It is still another object of the present invention to provide an apparatus for balancing a rotating object wherein the excess material in the heavy side of the rotating object may be quickly and efficiently removed.

Briefly, in accord with our invention, we provide an apparatus for and a method of balancing a rotating object wherein a laser pulse having a focal diameter substantially equal to the spacing between a pair of annular grooves on the rotating object is focused on the unit surface lying between the grooves and intersecting the heavy side of the rotating object. The laser beam causes some of the material of the rotating object to vaporize and leave a smooth depression without a recast layer.

The foregoing and other objects, features, and advantages of the invention will be apparent from the following, more particular description of the preferred embodiment of the invention, as illustrated in the accompanying drawings wherein:

FIG. 2 is a cross-sectional schematic view of one embodiment of our present invention used to irradiate a rotating object.

Figure 1A:
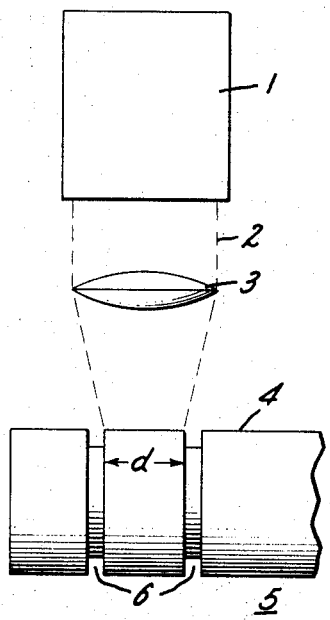
FIG. 1a is a cross-sectional schematic view of a rotating object being irradiated by a laser pulse in accordance with an embodiment of our present invention.

FIG. 1a illustrates a pulsed laser device 1 emitting a pulsed beam of radiation 2 which is focused by lens 3 on surface 4 of rotor 5. Surface 4 is also located between a pair of annular grooves 6. The grooves 6 are spaced a distance $d$ apart where $d$ is also the diameter of the focused beam of radiation 2 at its focal point.

Figure 1B:
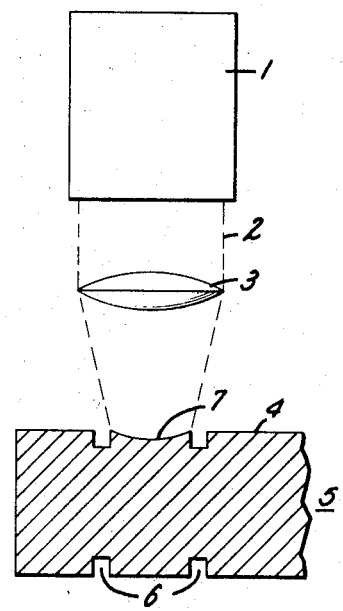
FIG. 1b is a cross-sectional schematic view of the rotating object of FIG. 1 after irradiation.

FIG. 1b illustrates the smooth concave or crater-like depression 7 left in the surface of rotor 4 bounded by annular grooves 6 after being irradiated by a series of laser pulses. The depression 7 approximates a slot having a width equal to the focused laser beam diameter and a length equal to the surface velocity of the rotor times the laser beam "pulse length."

Figure 1C:
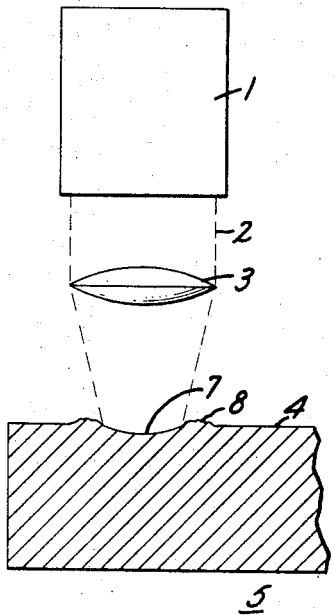
FIG. 1c is a cross-sectional schematic view of a rotating object after irradiation where the apparatus and method of our present invention was not utilized.

FIG. 1c is used in contrast to depict depression 7 left in rotor 5 after being struck by a laser pulse which was not focused between the annular grooves. Deposits 8, of the recasted material, are shown as having irregular shapes on either side of depression 7.

As is readily seen in FIG. 1a, the deposits of the recast material are virtually eliminated by focusing a pulsed laser beam on the surface of a rotating object which lies between a pair of annular grooves.

Because many units such as gyroscopic rotors are presently machined during fabrication with a series of grooves which act as guides for material removing drills, there is no additional expense involved to have grooves milled in annular pairs about the unit. As stated previously, the spacing between grooves in each pair is predetermined by the diameter of the focused laser beam. We have determined that optimum results occur when the groove spacing is approximately equal to the diameter of the laser beam at the focal point. The grooves have the following dual effect when a laser pulse is incident on the surface therebetween: first, the material which is not vaporized flows as a liquid parallel to the surface and over the edges into the space defined by the grooves, solidifies, and then falls away from the rotor; and second, a much higher temperature exists at the surface during the laser pulse of a given power density because the thermal conductivity of the air in the groove space is much lower than the thermal conductivity of the material. We have found that the latter effect becomes even more significant when aluminum and copper are employed as the object material.

The type of pulsed laser that may be used is varied. Any pulsed laser with characteristics necessary for the purposes intended is adequate. For example, neodymium doped glass and ruby rod lasers perform satisfactorily.

The "pulse length" or time duration of a laser pulse, the pulse energy, the surface velocity of the rotating object, and "material removal threshold" are variables which determine how much material may be removed by a single laser pulse. The material removal threshold may be defined as the power density required to cause material at the surface of an object to vaporize or otherwise be removed. It is evident that different materials have different material removal thresholds. We have found, however, that a laser pulse having a length of approximately 500 microseconds and energy of approximately 50 joules is sufficient to exceed the material removal thresholds of most materials even at rotational speeds in excess of 12,000 r.p.m.

The laser beam diameter at the focal point itself depends upon the lens focal length and the beam divergence. Thus, the groove spacing is also dependent upon the above. The spacing may be established through the relationship $d=f\theta$, where $d$ is the laser beam diameter (and spacing), $f$ is the lens focal length, and $\theta$ is the beam divergence. We have found that, although it is preferable that the surface of the object irradiated by the laser coincide with the laser pulse focal point, a 0.1 inch variance is allowable without adverse effects.

FIG. 2 illustrates an apparatus arrangement which may be used to remove material from a rotating object. Pulsed laser device 1 and focusing lens 3 are positioned so that pulses of radiation are focused at a point which substantially coincides with surface 4 of rotor 5 which lies between a pair of annular grooves 6. Motor 9 drives shaft 10 supported by supports 11. Vibration sensing coil 12 for detecting rotational vibrations of rotor 5 is attached to one of supports 11 and connected to balancing detector 13. Pulsed laser device 1 is also connected to balancing detector 13.

Balancing detector 13 may be one of a number of vibration detection and location devices as, for example, the type commercially available from the Gisholt Machine Company and known as the Masterline Hs-1 Balancer. Vibrations due to the asymmetrical distribution of material around the axis of rotation of rotor 5 are picked up by sensing coils 12 which generate an alternating voltage which is transmitted to balancing detector 13. Balancing detector 13 may be used to trigger or fire laser device 1 when the heavy side of rotor 5 is normal to the optical path. A firing repetition rate of one pulse per second or faster is preferred.

As would normally be expected, rotating units may be asymmetrical about both ends. It is desirable, therefore, but not absolutely essential, to utilize a second laser device. Thus, additional pulsed laser device 14, focusing lens 15, and sensing coil 16 may be employed in a like manner to simultaneously balance the opposite end of rotor 5. Pulsed laser device 14 is fired at appropriate intervals by balance detector 13 at surface 4 between annular grooves 17. As is readily evident, the above expedites balancing about both ends of the rotating unit.

From the foregoing discussion, it is readily apparent that the apparatus and method of our present invention attains the objects as previously set forth. By irradiating the surface of a rotating unit bounded by a pair of annular grooves with radiation emitted by a pulsed laser and focused to a diameter substantially equal to the spacing of the annular grooves, the excess material in the heavy side of the rotating unit is quickly and efficiently removed without forming the undesirable recast layer. It is also important to notice that balancing is performed while the object is rotating, thus eliminating time-consuming starting and stopping of rotation.

While there has been shown and described a specific embodiment of our invention, it will be understood by those skilled in the art, that various changes and modifications may be made in the illustrative embodiment as shown, without departing from the invention as set forth. The appended claims are not considered as limited by the embodiment shown but are intended to cover all such modifications thereof as fall within the spirit and scope of the claims.

What we claim as new and desire to secure by Letters Patent of the United States is:

1. A method for balancing rotating objects comprising the step of
    cutting into a surface of a rotating object at least one pair of annular grooves separated by a predetermined distance;
    locating the heavy side of the rotating object;
    generating a laser beam having a power density at a focal point greater than the material removal threshold of the rotating object; and
    focusing the laser beam substantially on a portion of the rotating object surface defined by the intersection of the heavy side with the area between the annular grooves such that the diameter of the focused laser beam is approximately equal to the predetermined distance between the annular grooves.

2. The method of claim 1 wherein the step of focusing further includes focusing the laser beam at a point within 0.1 of an inch of the surface portion of the rotating object.

3. The method of claim 2 wherein the step of generating the laser pulse further includes generating a laser beam having a length of approximately 500 microseconds and an energy of approximately 50 joules.

4. The method of claim 3 where the step of generating a laser beam further includes the steps of generating a laser beam at least once every second.

5. The method of claim 4 where the step of generating a laser beam is initiated only when the surface portion of the rotating object is normal to the path of the laser beam.

References Cited

UNITED STATES PATENTS 3,259,730   7/1966   Wehde et al. _____ 219—69
3,404,254   10/1968   Jones _____ 219—121

W. DEXTER BROOKS, Primary Examiner

U.S. Cl. X.R.

219—69